United States Patent
Murray et al.

(10) Patent No.: US 6,587,496 B1
(45) Date of Patent: Jul. 1, 2003

(54) SINGLE-MODE PUMP POWER SOURCE

(75) Inventors: James T. Murray, Tucson, AZ (US); William Austin, Tucson, AZ (US)

(73) Assignee: Lite Cycles, Inc., Tucson, AZ (US)

( * ) Notice: Subject to any disclaimer, the term of this patent is extended or adjusted under 35 U.S.C. 154(b) by 141 days.

(21) Appl. No.: 09/734,112

(22) Filed: Dec. 11, 2000

(51) Int. Cl.[7] .............................................. H01S 3/091
(52) U.S. Cl. .......................... 372/70; 372/22; 372/23; 372/39; 372/41; 372/69
(58) Field of Search ............................. 372/23, 70, 41, 372/22, 39, 69, 71, 96, 34; 359/330

(56) References Cited

U.S. PATENT DOCUMENTS

| | | | | |
|---|---|---|---|---|
| 5,166,948 A | * | 11/1992 | Gavrilovic et al. | 372/70 |
| 5,200,966 A | * | 4/1993 | Esterowitz et al. | 372/71 |
| 5,274,658 A | * | 12/1993 | Case et al. | 372/69 |
| 5,295,146 A | * | 3/1994 | Gavrilovic et al. | 372/41 |
| 5,341,389 A | * | 8/1994 | Payne et al. | 372/41 |
| 5,708,672 A | * | 1/1998 | Pessot et al. | 372/23 |
| 5,734,669 A | * | 3/1998 | Zhang et al. | 372/41 |
| 5,754,333 A | * | 5/1998 | Fulbert et al. | 359/330 |
| 5,802,086 A | * | 9/1998 | Hargis et al. | 372/22 |
| 5,854,802 A | * | 12/1998 | Jin et al. | 372/22 |
| 6,125,129 A | * | 9/2000 | Naegele et al. | 372/22 |
| 6,130,902 A | * | 10/2000 | Shimoji | 372/34 |
| 6,154,472 A | * | 11/2000 | MacKinnon et al. | 372/22 |
| 6,269,108 B1 | * | 7/2001 | Tabirions et al. | 372/39 |
| 6,304,584 B1 | * | 10/2001 | Krupke et al. | 372/22 |
| 6,370,180 B2 | * | 4/2002 | Zenteno | 372/96 |

* cited by examiner

*Primary Examiner*—Paul Ip
*Assistant Examiner*—Tuan Nguyen
(74) *Attorney, Agent, or Firm*—Howard R. Popper

(57) ABSTRACT

The mode and wavelength of a conventional, multi-mode, wide-stripe laser diode is converted in an $Nd^{3+}$ ion-doped laser host crystal to a stable, single-mode output that falls within the spectral region required for pumping EDFA amplifying structures. The host crystal absorbs radiation from the diode that corresponds with the $^4I_{9/2} \to {}^4F_{5/2}$ absorption band of its $Nd^{3+}$ ions, and re-radiates into the $^4F_{3/2} \to {}^4I_{9/2}$, $^4F_{3/2} \to {}^4I_{11/2}$, and $^4F_{3/2} \to {}^4I_{13/2}$ transitions which release photon energy that can be utilized by amplifying structures doped with $Er^{3+}$ and/or $Yb^{3+}$. The spatial mode of the multimode laser diode is converted to single-mode by enclosing the $Nd^{3+}$-doped host laser crystal within a laser cavity that has a fundamental mode size large enough to encircle the spatial extent of the beam emanating from the laser diode.

12 Claims, 3 Drawing Sheets

SINGLE-MODE PUMP POWER SOURCE

FIELD OF THE INVENTION

This invention relates to providing adequate pump power for driving single-mode fiber amplifier structures.

BACKGROUND OF THE PRIOR ART

Single-mode 1.5 micron amplifier structures, whether erbium-doped fiber (EDFA), or planar waveguide, are essential optical components used in telecomm, optical networking, and free-space communications applications. Optical amplification is provided via stimulated emission from activated excited $Er^{3+}$ ions at the signal wavelength, typically C-band, between 1530 and 1560 nm. The $Er^{3+}$ ions are excited by an optical "pump" source at either 980 or 1480 nm, which is usually generated by a diode laser.

The most commonly used pump sources for the 980 and 1480-nm bands are edge-emitting semiconductor lasers. Single-mode edge-emitting laser diodes are useful pump sources; however, their output power is severely limited because optical damage of the output facets occurs power at densities of about 10 $MW/cm^2$. As a consequence, single-mode pump sources are limited to about 350 mW of fiber-coupled output power so that high-power applications require multiple sources in each pump band and/or amplifier stages, which is complex and costly. Currently, the maximum rated fiber-coupled power for 980- and 1480-nm sources are 300 and 240 mW, respectively. The lifetime for telecomm components is measured in FIT, shorthand for failures-in-time. One FIT equals a single failure per $10^9$ device hours and currently 980- and 1480-nm diode sources are estimated to have less than <50 FIT. However at a unit cost of $1,200 and $4,500 per diode this failure rate leaves much to be desired.

Single-mode laser power is also limited by the narrowness of the gain region of edge-emitting laser diodes. Unfortunately, attempting to increase output power by increasing the width of the gain region causes higher order modes to begin to oscillate, thus reducing the brightness of the source. This effect is noticed when the spotsize within the semiconductor resonator is larger than the single-mode spotsize, e.g. >2 μm. Therefore while such "multi-mode" edge-emitting diode laser sources can output high optical powers e.g., >2 W, they are not viable single-mode pump sources for EDFAs and other Er-doped amplifying structures.

The need for a reliable, high power, single-mode pump source is particularly evident in long haul fiber-optic submarine cable networks which utilize remote pump sources to pump submerged Er-doped amplifier structures. These submerged amplifiers are distributed over several thousands of kilometers of fiber, so it is essential that the pump source operate in a spectral region that is highly transparent in the host fiber. In these cases, lasers that operate in the 1480-nm pump band are the only practical remote pump sources, since 1480-nm is located within the low-loss transmission window of silica fibers. The spacing between amplifiers typically ranges between 30 to 100 km; therefore, several tens of amplifiers are required to span a typical length of long-haul fiber e.g., 2000 to 8000 km. Because remotely pumped amplifiers are pumped in serial, the power required to pump multiple amplifiers scales with the number of amplifiers and with the number of channels. In practice, more watts of pump power are required to pump repeaterless long-haul networks than can conveniently be provided by the current state-of-the-art.

In addition to high power, the stability of pump wavelength is an important factor in obtaining optimum performance of the amplifying structure. Present day devices require special conditioning and feedback to achieve "gain-flattening" over the amplifier bandwidth. The most commonly employed means of stabilizing the output wavelength of semiconductor pump sources is via passive external feedback from a fiber Bragg grating (c.f., U.S. Pat. No. 6,044,093 and references therein). It would therefore be extremely advantageous to be able to economically generate several watts of frequency stable optical power in either or both the 980 and 1480-nm pump bands used in these EDFA applications without the need for wavelength stabilization measures.

SUMMARY OF THE INVENTION

We have recognized that the shortcomings of the prior art can be overcome by converting the mode and wavelength of a conventional, multi-mode wide-stripe laser diode to a stable, single-mode output that falls within the spectral region required for pumping EDFA amplifying structures. A diode laser is chosen that operates at a wavelength that corresponds with the $^4I_{9/2} \rightarrow {^4F_{5/2}}$ absorption band of $Nd^{3+}$ ions impregnated into a laser host crystal. The host crystal provides an appropriate environment to shift the known "4f" laser transitions to the absorption bands required by single-mode amplifying structures doped with $Er^{3+}$ and/or $Yb^{3+}$ that are to be pumped. The energy absorbed by the $Nd^{3+}$ ions in the host crystal is re-radiated into the $^4F_{3/2} \rightarrow {^4I_{9/2}}$, $^4F_{3/2} \rightarrow {^4I_{11/2}}$, and $^4F_{3/2} \rightarrow {^4I_{13/2}}$ transitions which release photon energy that can be utilized by amplifying structures doped with $Er^{3+}$ and/or $Yb^{3+}$. The spatial mode of the multimode laser diode is converted to single-mode by enclosing the $Nd^{3+}$-doped host laser crystal within a laser cavity that has a fundamental mode size large enough to encircle the spatial extent of the beam emanating from the laser diode. The resulting laser runs, or is forced to run, in a single spatial mode, which is appropriate for coupling into single-mode fiber and/or single-mode amplifying structures.

BRIEF DESCRIPTION OF THE DRAWING

The foregoing and other objects of the present invention may become more apparent from a reading of the ensuing description together with the drawing in which.

DESCRIPTION

Figure 1:
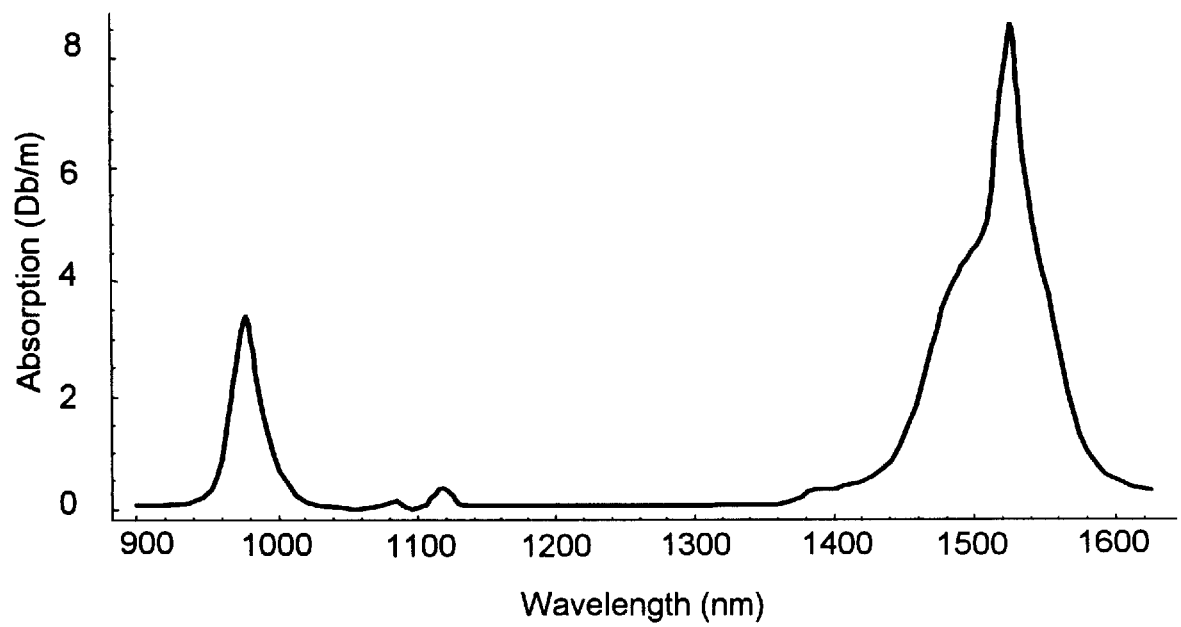
FIG. 1 shows the absorption spectrum of $Er^{3+}$ ions in a germano-alumino-silica fiber.

Trivalent neodymium ($Nd^{3+}$) has the electron configuration $(Xe):4f^3 5s^2 5p^6$. The 4f-electron state is unfilled, with one missing electron; whereas the outer 5s and 5p states are completely filled. The filled outer shell electrons shield the unfilled 4f-electrons from external influences. Consequently, the spectroscopic properties of the $Nd^{3+}$ ions are relatively invariant with respect to the host crystal into which the neodymium ions are introduced and also with respect to the environment (e.g., temperature and stress). The $5s^2 5p^6$ shells provide electrostatic shielding, akin to a metal sphere, and determine the atom-like rich spectroscopic properties of the $Nd^{3+}$ ion.

The $4f^3$ energy level configuration is composed of a number of separate and distinct states that arise from atomic interaction between electrons (spin-orbital levels), and from electrostatic interactions with neighboring atoms in the crystal host (Stark levels). The strong spin-orbital interactions split the $4f^3$ single electron orbital energy level into spin-orbital states labeled by Russell-Sanders term symbols $^{2S+1}L_J$, where S is the total spin, L is the total orbital angular momentum, and J is the total coupled angular momentum, which is a combination of the spin and orbital angular momentum. Spin-orbital states are often called multiplet states because they contain J+½ Stark levels, which arise from further splitting due to electrostatic perturbations induced from the crystal field generated by the neighboring ions that compose the host crystal. The crystal field strength and symmetry depend obviously on the constituent ions and internal structure of the crystal host. These differences are what cause the wavelength shift of laser transitions between hosts of $Nd^{3+}$ ions.

$Nd^{3+}$ has 17 terms $^2L$ $^2K$ $^4I$, 2 $^2H$, $^4G$, 2 $^2G$, $^4F$, 2 $^2F$, $^4D$, 2 $^2D$, $^2P$, and $^4S$, which categorized by the electrostatic interaction between the electrons occupying the orbitals. The interaction between the individual electrons spin and the orbital angular momentum lifts the level degeneracy of each term state with respect to the total coupled angular momentum, J. The ground state of $Nd^{3+}$ is the $^4I$ term, which is split by spin-orbital interactions into the multiplets: $^4I_{9/2}$, $^4I_{11/2}$, $^4I_{13/2}$, and $^4I_{15/2}$, in ascending order of energy. The next highest energy state is the $^4F$ term, which is split by spin-orbital interactions into the multiplets: $^4F_{3/2}$, $^4F_{5/2}$, $^4F_{7/2}$, and $^4F_{9/2}$, again, in ascending order of energy. The $^4F_{3/2}$ multiplet is metastable, with a lifetime of approximately 100 to 500 is. Therefore, electrons that are excited into states above the $^4F_{3/2}$ multiplet, will quickly trickle down and be trapped by the $^4F_{3/2}$ multiplet, which acts as an energy storage state, or upper laser state. Electrons that are trapped in the upper $^4F_{3/2}$ multiplet can undergo radiative transitions (transitions that release photons) to the four underlying $^4I$ multiplets. The energy released by the transition is in the form of light (photon), which has a wavelength corresponding to the energy of the transition. Optical gain is possible at each of the four transitions due to the metastable nature of the $^4F_{3/2}$ multiplet.

When the $Nd^{3+}$ ions are introduced into a crystal environment (through doping), the J+½ degeneracy of the multiplets is broken due to the interaction of the electrons with the crystal field (Stark splitting). The crystal field interaction is weak due to the shielding of the outlying 5s and 5p filled states. Therefore, the splitting of the multiplet levels is small compared to the energy separation between multiplets. The exact energy of the J+½ Stark sublevels within each multiplet is dependent on the strength and structure of the induced crystal field, which is obviously dependent on the constituent ions and internal structure of the crystal host. The structural (symmetry) and constituent differences between host crystals give rise to the variation in output wavelengths.

Figure 2:
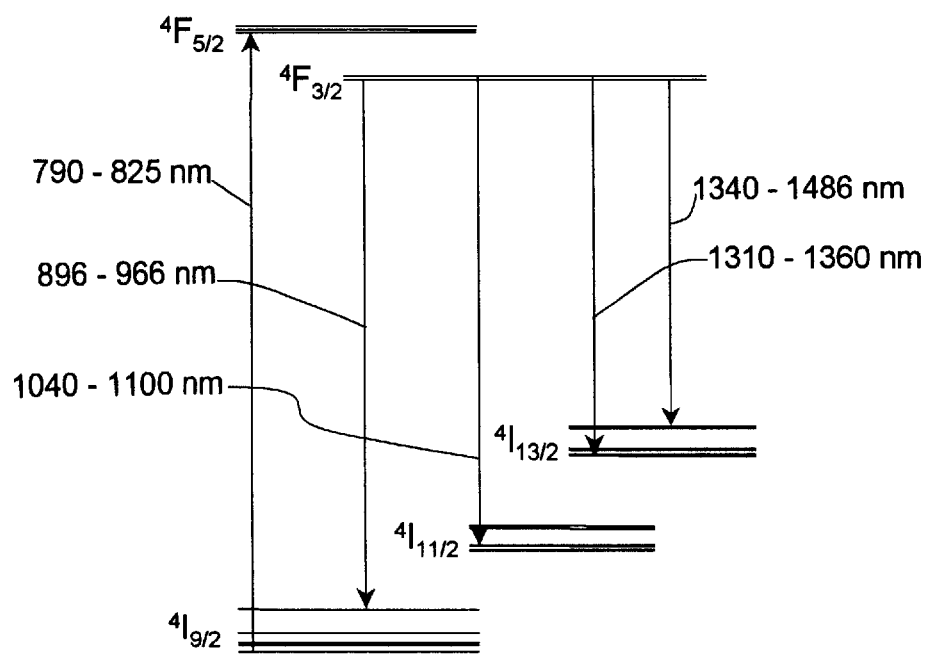
FIG. 2 shows primary pump and laser transitions in $Nd^{3+}$ ions doped within a crystal host.

FIG. 2 shows the lowest two $^4F$ multiplets, and the lowest three $^4I$ multiplets of $Nd^{3+}$ ions doped within a crystal host. Ground state electrons (the lowest Stark level of the $^4I_{9/2}$ multiplet) can be excited to the metastable multiplet $^4F_{3/2}$ by optical "pumping". The optical pumping field may be derived from either an incoherent or coherent (laser) source at the proper wavelength (i.e., at an absorbing wavelength). In the interest of efficiency, it is desirable to utilize a pump source with minimum photon energy above the metastable state, at a wavelength that is efficiently absorbed by the $Nd^{3+}$ ions. The transition $^4I_{9/2} \rightarrow ^4F_{5/2}$ provides a strong resonant absorption to a state just above the $^4F_{3/2}$ metastable state. This transition occurs at a peak wavelength that is between 790 and 825-nm, depending on the $Nd^{3+}$ host crystal. The peak absorption occurs for a pump wavelength that is resonant with the transition between the lower Stark levels of the $^4I_{9/2}$ and $^4F_{5/2}$ multiplets, respectively. The bandwidth of the absorption peak is quite small ($\Delta\lambda$~3–10 nm FWHM); therefore, pumping with coherent (laser) sources is desirable since incoherent sources have a large bandwidth by definition. Fortunately, a laser diode based on gallium aluminum arsenide, and in particular $Ga_{0.93}Al_{0.07}As$, can produce very high average output powers (>2 W per emitter) in this spectral region at the required bandwidth.

Figure 3:
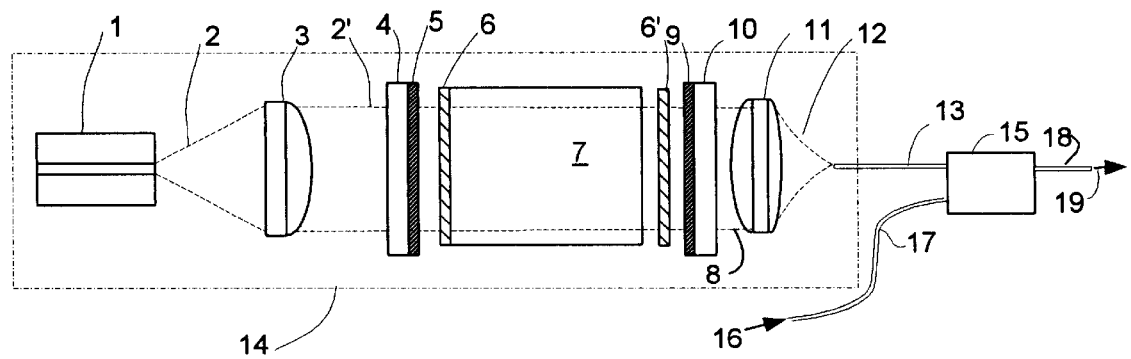
FIG. 3 shows the apparatus of the invention for converting a high power multimode laser output to a single-mode, high power output for driving a single-mode fiber/amplifying structure.

In an illustrative embodiment of our invention, shown in FIG. 3, the principle transitions shown in FIG. 2 are employed to derive single-mode pump power from a conventional, wide-stripe high power laser diode 1. Diode 1, which may be fabricated, e.g., of gallium aluminum arsenide, produces a multimode output beam 2 that is conditioned by optics 3 to be directed to insulating crystal 7 which is positioned within a resonant cavity that produces a single-mode output beam 8. Crystal 7 is doped with $Nd^{3+}$ ions whose absorption band lies between 790 and 830 nm. The $Nd^{3+}$ ions are excited by the wavelength of beam 2 which is designed to lie within the primary $^4I_{9/2} \rightarrow ^4F_{5/2}$ absorption band of the $Nd^{3+}$. Diode laser 1 easily produces a high output power >2 W in the spectral region between 790 and 830-nm. Because the central wavelength of diode 1 will change or "tune" with temperature, it is advisable to maintain its temperature (by means, not shown), within the range corresponding to the peak of the $^4I_{9/2} \rightarrow ^4F_{5/2}$ absorption band of the $Nd^{3+}$-ions in crystal 7. However it will be appreciated that maintaining temperature stability of a conventional multimode diode laser is a much easier task than maintaining frequency stability of a conventional single-mode diode laser.

Let it be assumed that crystal 7 is of cylindrical cross section. Lens 3 directs beam 2 from laser 1 to the cylindrical section of the laser crystal. The laser cavity that produces single-mode output beam 8 may be formed by using mirrors 4, 10 having reflective surfaces 5 and 9 at either end of crystal 7, or with equally advantageous results, by applying reflective surfaces 6, 6' directly to crystal 7. The cavity stimulates radiation within crystal 7 from either or both of the $^4F_{3/2} \rightarrow ^4I_{9/2}$ and $^4F_{3/2} \rightarrow ^4I_{3/2}$ transitions in $Nd^{3+}$, where the transitions are between the lower Stark level of the $^4F_{3/2}$ manifold and the upper Stark level of the $^4I_{9/2}$ and $^4I_{3/2}$ multiplets, respectively, see FIG. 2. Reflective surfaces 5 and 9 are preferably multi-layer dielectric thin films coatings, which can be deposited using standard vacuum deposition techniques.

The laser cavity thus formed is designed such that the single-mode size within crystal 7 is larger or equal to the size of the multimode beam 2 from pump diode 1. In this way, all of the multimode pump radiation from laser diode 1 is coupled into the single-mode volume of the cavity, effectively converting the multimode beam to a single-mode beam. Now, the single-mode spotsize is largely dependent on the length of the laser cavity and the power of the thermal lens induced in the laser crystal by optical pumping. Therefore, the cavity is designed to optimize the pump spotsize and cavity length such that the pumped volume overlaps the single-mode cavity volume ideally.

The distribution of the diode radiation within the cylindrical section of crystal 7 may be either uniform or super-Gaussian, and is substantially absorbed within the first 2 to 10 mm of the cylinder, depending on the concentration of $Nd^{3+}$ ions and properties of the host crystal. More than half of the radiation that is absorbed may be converted to heat. The other fraction of pump energy is converted to photons (light), which are either in or out of the lasing band. The heat that is generated has the same transverse distribution as the pump beam. This heat must be conducted out of the crystal (by means not shown) to prevent the crystal from fracturing due to thermal stress. The majority of the heat flows radially out towards the sides of the crystal where it is conducted to a heat sink through metal fixtures (not shown). This radial heat dissipation leads to a radial temperature distribution that has a hot center and cold edges. The optical properties of crystal 7 are altered through the temperature dependence of the index of refraction, n(T), which is predominantly linearly proportional to the temperature. Therefore, the index of refraction distribution in crystal 7 will closely match the temperature distribution. Light rays traveling though the graded index profile will follows paths, "geodesics", that minimize the time of travel. Light geodesics always bend towards regions of higher index. Consequently, on-axis rays travel straight, and off-axis rays bend towards the center. Notably, the index profile is very much like a lens; hence the term "thermal lens".

Surfaces 6 and 6', as well as reflective surfaces 5, 9, are chosen to reject transmit radiation that is generated from the $^4F_3 \rightarrow ^4I_{11/2}$ transition in $Nd^{3+}$, which lies outside the pump bands of $Er^{3+}$ so as to prevent the laser from oscillating at an undesired wavelength. Such undesired oscillation is prevented so long as the net roundtrip cavity loss exceeds the gain at the transition. It is recognized that more powerful oscillation suppression techniques e.g., absorption filters may be desirable to fully suppress this strong transition.

Figure 5:
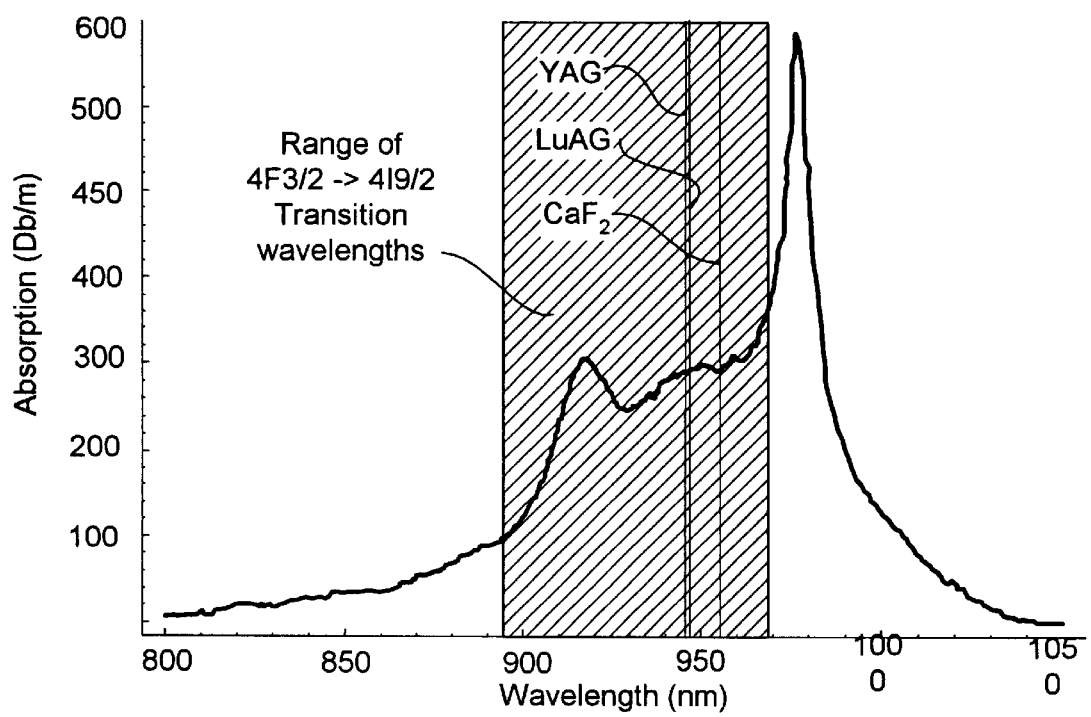
FIG. 5 shows the absorption spectra of the 980-nm pump band in a typical co-doped Yb, Er—single-mode silica fiber.

Alternatively, it may be desirable, when Yb is added as a co-doping agent in an Er-doped amplifying structure, e.g., 15, to promote oscillation at the $^4F_{3/2} \rightarrow ^4I_{11/2}$ transition of $Nd^{3+}$ since the absorption band of $Yb^{3+}$ may extend into the spectral region corresponding to this $Nd^{3+}$ transition, as shown in FIG. 5.

The oscillating, single-mode output beam 8 is partially transmitted by reflective surface 9 of mirror 10 and is shaped by lens 11 into a beam 12 that matches both the numerical aperture and mode size diameter of a single-mode fiber pigtail 13. The fiber-coupled pump radiation is then directed into a single-mode Er-doped amplifying structure 15, which amplifies the signal radiation 16 delivered by single-mode fiber 17. The amplified signal 19 is output via the single-mode fiber 18. In summary, the function of the wavelength and mode conversion apparatus 14 is to efficiently convert the high-power multimode radiation beam 2 to a single-mode high-power beam 12 that resides spectrally within a pump band of either $Er^{3+}$ or $Yb^{3+}$ ions doped within the amplifying structure 15.

In alternative embodiment, (not shown) the mirror elements 4 and 10 may be removed and reflective coatings 5 and 9 applied directly to the laser crystal 7. As is well known in the art, coatings 5 and 9 can either be applied in combination with the high transmission i.e., anti-reflection coatings 6, 6' or a single multi-purpose coating can be applied to the surfaces that has both the desired reflective and transmissive properties as the combination of 5, 6, 6' and 9. Such a monolithic laser device is called an optically-pumped micro-chip laser.

If crystal 7 is made using more highly conductive materials, such as Nd:YAG, less thermal lensing will be effected. The sign of the lens (i.e., positive or negative lens) is dependent on the sign (and strength) of the change of index with temperature (dn/dT). In some materials, such as Nd:YLF, dn/dT is negative, and the thermal lens is consequently negative. This can impact the laser cavity in a negative way, since a strong negative lens can make the cavity unstable causing its operation to cease due to the large diffraction losses. Moreover, the single-mode spotsize within the crystal is largely dependent on the end mirror curvature, cavity length, and thermal focal length. The cavity optics and length have to be designed to yield a single mode spotsize that matches the multimode spotsize of the pump laser beam within the laser crystal; otherwise, the laser will not operate efficiently in a single mode. The thermal lens is obviously variable, with a dependence on both the pump spotsize and pump strength (i.e., power), and is therefore, a very important parameter used in optimizing the design of the laser cavity.

It should be apparent that instead of directly coupling the output of the laser diode into conditioning optics 3, the multimode beam from diode 1 may first be conditioned and focused (by a micro-lens assembly, not shown) into a multimode fiber pigtail (not shown). The output of the multimode fiber pigtail may then be conditioned by optics similar to optics 3 into a comparable beam 2 which overlaps the single-mode, fundamental beam 8 within the laser crystal 7 of mode and wavelength converter unit 14.

It is appreciated that the power from the laser diode 1 can be increased linearly when an array (not shown) of such laser diodes is used in place of a single diode. Correspondingly, each emitter can be coupled into a separate multimode fiber (not shown), and the combination of which can be formed into a fiber bundle (not shown). The plurality of output beams emanating from the fiber bundle can then be either directed into an appropriately designed mode-matching lens assembly comparable to lens 3, or the multi-beam output can be coupled into a correspondingly larger core multimode fiber. In the later case, the homogenized output from the large-core multimode fiber is then directed into an appropriate mode-matching lens assembly 3.

Figure 4:
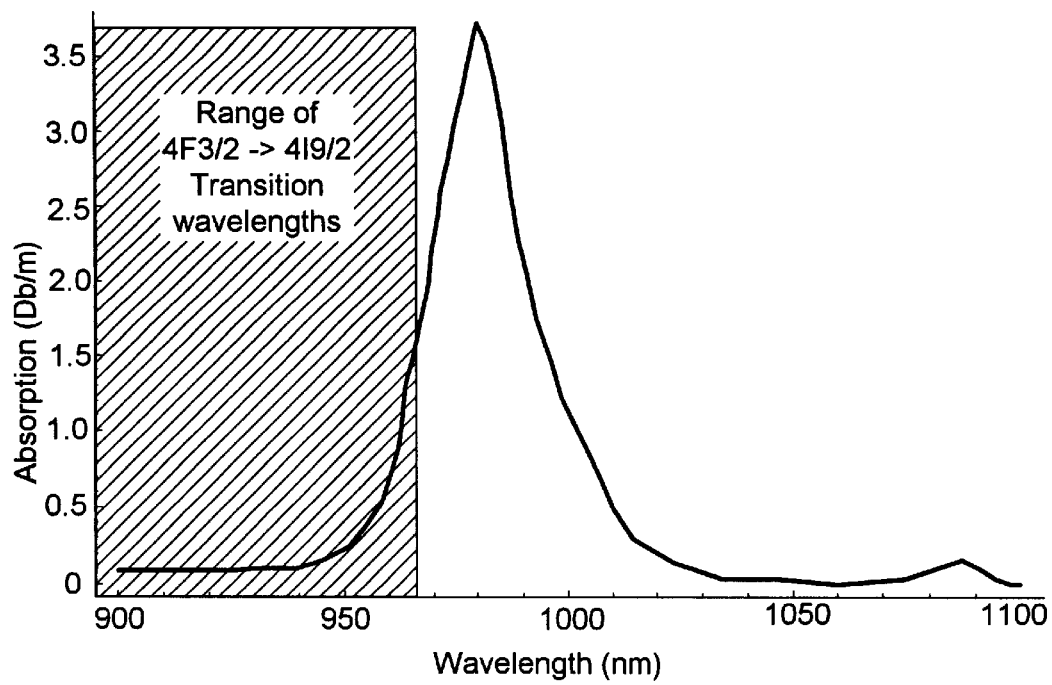
FIG. 4 shows the range of $Nd^{3+}$ $^4F_{3/2}$ to $^4I_{9/2}$ transition wavelengths in the absorption spectra of an $Er^{3+}$ doped germano-alumino-silica fiber.

Focusing now on the spectroscopic properties of the transition between the lower Stark level of the $^4F_{3/2}$ multiplet and the upper Stark level of the $^4I_{9/2}$ multiplet of $Nd^{3+}$ in specific host crystals: Table 1 contains the predicted wavelength of this transition for several known crystal hosts. From table 1 and considering the absorption spectrum of $Er^{3+}$ in silicate fiber, shown in FIG. 4, it is clear that only $Nd:Sc_2O_3$ is capable of directly pumping $Er^{3+}$. However, co-doping crystal 7 with $Yb^{3+}$ can broaden the absorption spectrum (c.f., FIG. 5), extending it into the bluer, shorter wavelength regions. In such cases, $Yb^{3+}$ absorbs the pump energy and the energy is rapidly and efficiently transferred to the $Er^{3+}$ ions via cross-relaxation means.

Referring now to the absorption spectrum of co-doped Er, Yb silicate fibers, shown in FIG. 5, it is evident that all the representative host crystals given in Table 1 have emission within the expanded pump band region. As a further consequence of co-doping, the absorption spectrum is flattened over the region of the various $^4F_{3/2} \rightarrow {}^4I_{9/2}$ transition wavelengths. This has the added benefit of reducing the sensitivity of the amplifier performance to fluctuations in the wavelength of the pump laser, which is inherently <0.1-nm rms.

TABLE 1

| Material Formula | Common Name | $^4F_{3/2} \rightarrow {}^4I_{9/2}$ Wavelength nm | Ground State Splitting cm$^{-1}$ |
|---|---|---|---|
| LiNdP$_4$O$_{12}$ | | 896 | 326 |
| NdP$_5$O$_{14}$ | NPP | 896 | 314 |
| La$_2$O$_{2S}$ | | 900 | 740 |
| LaF$_3$ | | 902 | 502 |
| PbMoO$_4$ | | 906 | 363 |
| KLaMoO$_{42}$ | | 906 | 355 |
| SrWO$_4$ | | 907 | 395 |
| SrMoO$_4$ | | 907 | 377 |
| Pb$_5$PO$_{43}$ | | 908 | 419 |
| LiYF$_4$ | YLF | 908 | 528 |
| LiLaMoO$_{42}$ | | 910 | 400 |
| NaLaWO$_{42}$ | | 911 | 424 |
| NaLaMoO$_{42}$ | | 911 | 403 |
| LaAlO$_3$ | | 911 | 604 |
| KGdWO$_{42}$ | KGW | 911 | 340 |
| LiGdMoO$_{42}$ | | 914 | 446 |
| KYWO$_{42}$ | KYW | 914 | 355 |
| CaAl$_4$O$_7$ | | 915 | 437 |
| CaWO$_4$ | | 915 | 472 |
| YVO$_4$ | Ortho-vanadate | 915 | 433 |
| CaMoO$_4$ | | 915 | 458 |
| KYMoO$_{42}$ | | 915 | 326 |
| K$_5$NdMoO$_{44}$ | | 918 | 474 |
| Bi$_4$Si$_3$O$_{12}$ | | 919 | 450 |
| Bi$_4$Ge$_3$O$_{12}$ | | 919 | 444 |
| LaNbO$_4$ | | 919 | 506 |
| CaLa$_4$SiO$_{43}$O | | 919 | 447 |
| CaY$_4$SiO$_{43}$O | | 921 | 446 |
| CaNbO$_{32}$ | | 921 | 522 |
| La$_2$Be$_2$O$_5$ | BEL | 925 | 495 |
| GdAlO$_3$ | GAG | 927 | 666 |
| LiNbO$_3$ | | 929 | 486 |
| YAlO$_3$ | YALO or YAP | 930 | 671 |
| LuAlO$_3$ | | 932 | 662 |
| La$_2$O$_3$ | | 936 | 487 |
| Ba$_2$ZnGe$_2$O$_7$ | | 936 | 700 |
| Gd$_3$Sc$_2$Ga$_3$O$_{12}$ | GSGG | 937 | 763 |
| Gd$_3$Ga$_5$O$_{12}$ | GGG | 937 | 772 |
| Lu$_3$Ga$_5$O$_{12}$ | LGG | 938 | 777 |
| Y$_3$Sc$_2$Ga$_3$O$_{12}$ | YSGG | 938 | 778 |
| Y$_3$Ga$_5$O$_{12}$ | YGG | 938 | 784 |
| CaMg$_2$Y$_2$Ge$_3$O$_{12}$ | CAMGAR | 940 | 807 |
| Gd$_3$Sc$_2$Al$_3$O$_{12}$ | GSAG | 942 | 808 |
| Lu$_3$Sc$_2$Al$_3$O$_{12}$ | LSAG | 942 | 808 |
| Ca$_5$PO$_{43}$F | FAP | 943 | 708 |
| Y$_3$Sc$_2$Al$_3$O$_{12}$ | YSAG | 943 | 821 |
| Sr$_5$PO$_{43}$ | | 943 | 740 |
| LiYO$_2$ | | 946 | 639 |
| Y$_3$Al$_5$O$_{12}$ | YAG | 946 | 857 |
| Y$_2$O$_2$ | YO | 947 | 643 |
| Lu$_3$Al$_5$O$_{12}$ | LuAG | 947 | 878 |
| CaF$_2$ type II | | 955 | 925 |
| YScO$_3$ | | 956 | 709 |
| Sc$_2$O$_3$ | | 966 | >700 |

The last column in Table 1 contains the ground state splitting energy of the $^4I_{9/2}$ multiplet due to the crystal field. The terminal laser level for the $^4F_{3/2} \rightarrow {}^4I_{9/2}$ transition is within the $^4I_{9/2}$ multiplet; therefore, the laser system for this particular transition is quasi-three-level in nature. Specifically, the lower lasing transition terminates at the top Stark sub-level of the $^4I_{9/2}$ manifold, which is elevated by the splitting energy above the true ground state. Consequently, the lower transition level has a finite population due to thermal excitation, thus reducing the overall gain and efficiency of the laser through re-absorption losses.

It is therefore desirable to select a host with the largest possible ground state splitting energy to reduce the deleterious effects of re-absorption loss. Referring to the last row in Table 1 the materials YAG, LuAG, and type-II CaF$_2$ exhibit the largest ground-state splitting energies. These host, and others with similarly high ground-state splitting energies, are therefore ideal candidate materials for our application.

Figure 6:
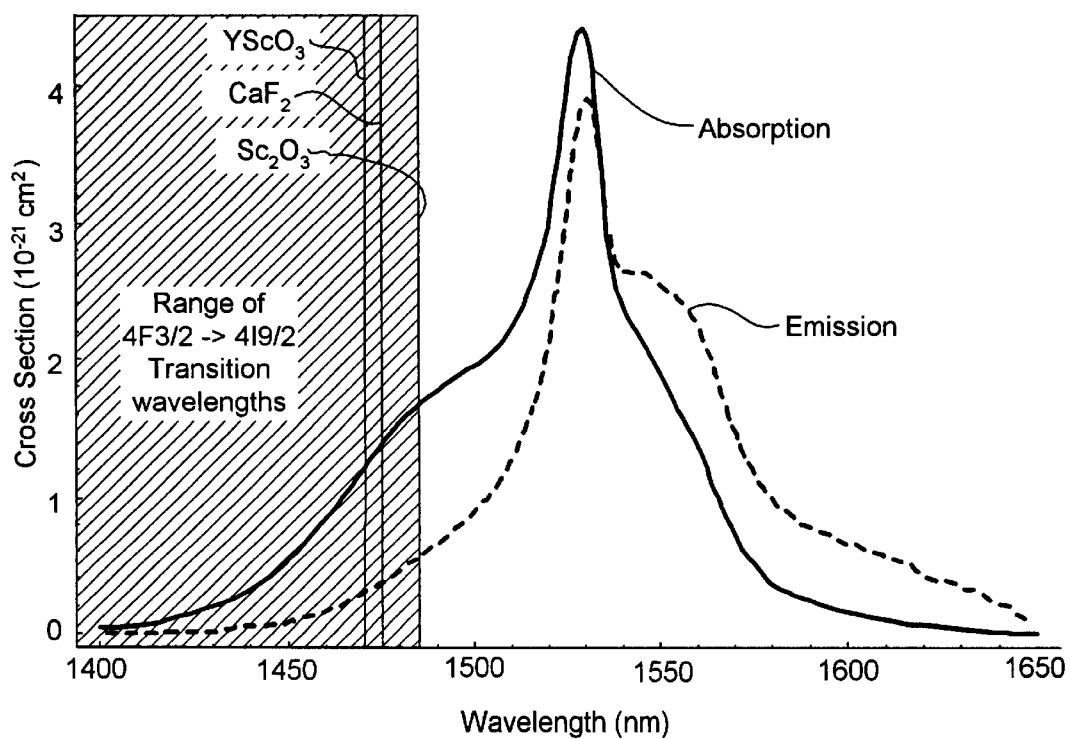
FIG. 6 shows the absorption (solid) and emission (dashed) cross section spectrum near the 1480-nm pump band of $Er^{3+}$ in a germano-alumino-silica fiber.

Table 2 shows the spectroscopic properties, including the predicted wavelength, of the $^4F_{3/2} \rightarrow {}^4I_{13/2}$ transition between the lower Stark level of the $^4F_{3/2}$ multiplet and the upper Stark level of the $^4I_{13/2}$ multiplet of Nd$^{3+}$ for several representative host crystals. Unlike the 980-nm pump band, the 1480-nm pump band originates between the same Er$^{3+}$: $^4I_{15/2} \rightarrow {}^4I_{13/2}$ multiplet transition as the 1530 to 1560-nm C-band gain transition. Consequently, there is a finite emission cross section at the pump wavelength that increases in strength as the pump wavelength approaches the gain band edge at 1530-nm, as shown in FIG. 6. Therefore, the optimum pump wavelength resides below the absorption peak along the slope of the absorption curve in the vicinity of 1480-nm. Referring to Table 2 it is clear that YSc$_2$O$_3$, CaF$_2$, and Sc$_2$O$_3$ are the only Nd hosts listed that have emission in the vicinity of 1480-nm. Therefore, these are the preferred materials to use in this application.

TABLE 2

| Material Formula | Common Name | $^4F_{3/2} \rightarrow {}^4I_{13/2}$ lower-to-upper Wavelength nm |
|---|---|---|
| CaNbO$_{32}$ | | 1340 |
| LiNdP$_4$O$_{12}$ | | 1360 |
| LaF$_3$ | | 1366 |
| NdP$_5$O$_{14}$ | NPP | 1369 |
| LiYF4 | YLF | 1370 |
| PbMoO$_4$ | | 1378 |
| SrWO$_4$ | | 1378 |
| SrMoO$_4$ | | 1379 |
| KLaMoO$_{42}$ | | 1380 |
| Pb$_5$PO$_{43}$ | | 1383 |
| NaLaWO$_{42}$ | | 1383 |
| NaLaMoO$_{42}$ | | 1384 |
| LiLaMoO$_{42}$ | | 1385 |
| LiGdMoO$_{42}$ | | 1386 |
| CaWO$_4$ | | 1388 |
| YVO$_4$ | Ortho-vanadate | 1390 |
| CaMoO$_4$ | | 1390 |
| CaLa$_4$SiO$_{43}$O | | 1392 |
| KYMoO$_{42}$ | | 1397 |
| CaAl$_4$O$_7$ | | 1398 |
| CaY$_4$SiO$_{43}$O | | 1398 |
| KGdWO$_{42}$ | KGW | 1399 |
| LaNbO$_4$ | | 1399 |
| Bi$_4$Si$_3$O$_{12}$ | | 1401 |
| Bi$_4$Ge$_3$O$_{12}$ | | 1403 |
| KYWO$_{42}$ | KYW | 1404 |
| K$_5$NdMoO$_{44}$ | | 1411 |
| LiNbO$_3$ | | 1421 |
| Gd$_3$Ga$_5$O$_{12}$ | GGG | 1423 |
| Y$_3$Ga$_5$O$_{12}$ | YGG | 1423 |
| La$_2$Be$_2$O$_5$ | BEL | 1424 |
| Y$_3$Sc$_2$Ga$_3$O$_{12}$ | YSGG | 1425 |
| Gd$_3$Sc$_2$Ga$_3$O$_{12}$ | GSGG | 1426 |
| GdAlO$_3$ | | 1427 |
| Lu$_3$Ga$_5$O$_{12}$ | LGAG | 1427 |
| YAlO$_3$ | YALO or YAP | 1434 |
| CaMg$_2$Y$_2$Ge$_3$O$_{12}$ | CAMGAR | 1436 |
| LuAlO$_3$ | | 1437 |
| Gd$_3$Sc$_2$Al$_3$O$_{12}$ | GSAG | 1440 |
| Lu$_3$Sc$_2$Al$_3$O$_{12}$ | LSAG | 1440 |
| Y$_3$Sc$_2$Al$_3$O$_{12}$ | YSAG | 1440 |
| Lu$_3$Al$_5$O$_{12}$ | LAG | 1443 |
| Y$_3$Al$_5$O$_{12}$ | YAG | 1444 |

TABLE 2-continued

| Material Formula | Common Name | $^4F_{3/2} \rightarrow {}^4I_{13/2}$ lower-to-upper Wavelength nm |
|---|---|---|
| $Ca_5PO_{43}F$ | FAP | 1447 |
| $LiYO_2$ | | 1451 |
| $Y_2O_2$ | YO | 1454 |
| $YScO_3$ | | 1471 |
| $CaF_2$ type II | | 1475 |
| $Sc_2O_3$ | | 1486 |

We have recognized that simple, inexpensive, single-mode micro-chip lasers can be fabricated out of specific Nd-doped materials to provide either or both pump wavelengths in the 980- and 1480-nm pump band regions of Er or codoped Er, Yb amplifying systems. These lasers effectively convert the spatial structure and wavelength of high-power laser diodes to radiation that is appropriate for pumping single-mode Er-doped amplifying structures. We believe that these sources will provide a simple, inexpensive solution to the growing need for higher power EDFA pump sources. What has been described is deemed to be illustrative of the principles of the invention. Further and other embodiments may be devised by those skilled in the art without, however, departing from the spirit and scope of our invention.

What is claimed is:

1. A crystal arrangement for providing single-mode pumping of an $Er^{3+}$ and co-doped $Er^{3+}$, $Yb^{3+}$ 1.5-$\mu$m amplifying structure comprising:
   a. an insulating crystal having $Nd^{3+}$ ions dispersed therein; said $Nd^{3+}$ ions having a primary absorption band defined by a $^4I_{9/2} \rightarrow {}^4F_{5/2}$ transition;
   b. means for defining within said crystal a single-mode laser cavity volume for re-radiating energy into any of the $^4F_{3/2} \rightarrow {}^4I_{9/2}$, $^4F_{3/2} \rightarrow {}^4I_{11/2}$, and $^4F_{3/2} \rightarrow {}^4I_{13/2}$ bands;
   c. a multimode laser diode for directing a multimode beam to said single mode laser cavity volume of said crystal; and
   d. means for coupling said re-radiating energy into said amplifying structure.

2. The combination of claim 1 wherein said means for coupling includes a lens coupling said output of said multimode diode to said crystal.

3. The combination of claim 1 wherein said cavity is defined by mirror surfaces at opposite ends of said crystal.

4. Laser apparatus, comprising:
   a. a host crystal doped with $Nd^{3+}$ ions;
   b. a mirror for defining within said crystal a single-mode laser cavity volume, said volume being capable of absorbing energy in the $^4I_{9/2} \rightarrow {}^4F_{5/2}$ bands and of re-radiating energy into any of the $^4F_{3/2} \rightarrow {}^4I_{9/2}$, $^4F_{3/2} \rightarrow {}^4I_{11/2}$, and $^4F_{3/2} \rightarrow {}^4I_{13/2}$ bands;
   c. a multimode laser diode laser which operates at a wavelength that corresponds with the $^4I_{9/2} \rightarrow {}^4F_{5/2}$ absorption band of said $Nd^{3+}$ ions for directing multimode beam energy to said single-mode laser cavity volume of said host crystal; and
   d. a single-mode $Er^{3+}$-doped amplifying structure coupled to receive single-mode energy from said host crystal.

5. The combination of claim 4 wherein said crystal is part of a laser cavity and wherein said laser diode produces a multimode conditioned beam directed at said cavity.

6. The combination of claim 4 wherein said cavity has a fundamental mode size large enough to encircle the spatial extent of said multimode beam.

7. The combination of claim 6, wherein said crystal includes reflective surfaces defining said cavity.

8. The combination of claim 7, wherein said cavity surfaces reflect stimulated radiation from transitions lying between the lower Stark level of the $^4F_{3/2}$ manifold and the upper Stark level of the $^4I_{9/2}$ and $^4I_{13/2}$ multiplets.

9. The combination of claim 7 wherein said cavity includes reflective surfaces of multi-layer dielectric thin film.

10. The combination of claim 9 wherein said surfaces are coated to transmit radiation that lies outside the pump bands of $Er^{3+}$.

11. The combination of claim 4 wherein said $Er^{3+}$-doped amplifying structure includes $Yb^{3+}$ as a co-doping agent having an absorption band extending into the spectral region corresponding to the $^4F_{3/2} \rightarrow {}^4I_{11/2}$ and $^4F_{3/2} \rightarrow {}^4I_{9/2}$ transitions of $Nd^{3+}$.

12. The combination of claim 4 wherein said crystal is selected from the group consisting of YAG, LuAG, and type-II $CaF_2$.

* * * * *